United States Patent [19]

Davis, Jr. et al.

[11] Patent Number: 6,057,854

[45] Date of Patent: May 2, 2000

[54] SYSTEM AND METHOD OF PROVIDING INTERACTIVE VECTOR GRAPHICS OVER A NETWORK

[75] Inventors: John R. Davis, Jr., Garland; Scott M. Glazer, Richardson, both of Tex.

[73] Assignee: Micrografx, Inc., Allen, Tex.

[21] Appl. No.: 08/901,043

[22] Filed: Jul. 28, 1997

Related U.S. Application Data

[60] Provisional application No. 60/040,332, Mar. 7, 1997.

[51] Int. Cl.[7] ................................................. G06T 13/00
[52] U.S. Cl. .......................... 345/433; 345/441; 345/443; 345/334; 345/339; 707/502; 707/513; 707/515; 707/528
[58] Field of Search ..................................... 345/433, 441, 345/443, 339, 334; 707/502, 513, 515, 528

[56] References Cited

U.S. PATENT DOCUMENTS

| | | | |
|---|---|---|---|
| 5,530,947 | 6/1996 | Takasaki et al. | 345/461 |
| 5,592,602 | 1/1997 | Edmunds et al. | 345/474 |
| 5,742,768 | 4/1998 | Gennaro et al. | 395/200.33 |
| 5,754,774 | 5/1998 | Bittinger et al. | 395/200.33 |
| 5,764,235 | 6/1998 | Hunt et al. | 345/428 |
| 5,819,077 | 10/1998 | Koga et al. | 395/561 |

*Primary Examiner*—Mark K. Zimmerman
*Assistant Examiner*—Albert K. Lee
*Attorney, Agent, or Firm*—Baker Botts L.L.P.

[57] ABSTRACT

An interactive vector object (56, 76, 102) operable to be downloaded over a network (16) may comprise data (58, 104) to render an image of the vector object (56, 76, 102) and an active area defined by the vector object (56, 76, 102). A vector graphics network file (88) may in connection with the data (58, 104) render the image of the vector object (56, 76, 102) on a client system (14) connectable to the network (16).

79 Claims, 5 Drawing Sheets

SYSTEM AND METHOD OF PROVIDING INTERACTIVE VECTOR GRAPHICS OVER A NETWORK

RELATED APPLICATIONS

This application claims the benefit of U.S. Provisional Application Serial No. 60/040,332, filed Mar. 7, 1997.

TECHNICAL FIELD OF THE INVENTION

This invention relates generally to the field of computer graphics, and more particularly to a system and method of providing interactive vector graphics over a network.

BACKGROUND OF THE INVENTION

Web pages are well known for providing graphics and associated information over the Internet. A Web page generally includes an HTML file with embedded bit mapped graphics. The HTML file may be created and bit mapped graphics embedded in the file using an HTML editor. Generally described, bit mapped graphics are computer graphics stored as collections of bits in memory locations corresponding to pixels on the screen. Thus, images are treated as a collection of dots. As a result, bit mapped graphics files are generally large and take a relatively long amount of time to download over the Internet. Additionally, the bit mapped graphics are static and device dependent.

A hot spots editor may be used to generate hot spots for a graphic. A hot spot associates an action with a defined area of the graphic. For Web pages, such actions may include changing a browser status line or jumping to another Web page in response to a user click in the defined area. The hot spot editor approach is inflexible in that only rectangular hot spots can generally be defined. This becomes significant in certain applications such as maps where the regions are too complicated to describe using simple rectangles.

SUMMARY OF THE INVENTION

Accordingly, a need has arisen in the art for improved network graphics. The present invention provides interactive vector graphics that substantially reduce or eliminate disadvantages and problems associated with prior network graphics.

In accordance with the present invention, an interactive vector object operable to be downloaded over a network may comprise data to render an image of the vector object and an active area defined by the vector object. A vector graphics network file may in connection with the data render the image of the vector object on a client system connectable to the network.

More specifically, in accordance with one embodiment of the present invention, the data may comprise a type, a sizes, and a location of the vector object. In this embodiment, the active area may be defined by the type, size, and location of the vector object. The vector object may include a property defining a command to be performed in response to an event within the active area of the vector object. In this embodiment, the command may be operable to alter the image of the vector object on the client system. The vector graphics network file may comprise a vector graphics extension of the client system.

In accordance with another aspect of the present invention, a system to provide interactive vector graphics over a network may comprise a server system and a client system. The server system may include a network accessible file and a vector graphics file comprising the interactive vector object. In this embodiment, the vector graphics file may be linked to the network accessible file. The client system may include a network application file to connect to the server over the network to retrieve the network accessible file. The network application file may read the network accessible file and retrieve the linked vector graphics file. A vector graphics extension may read the data to render the image of the vector object. The network accessible file may be an HTML file. The network application file may be an Internet browser.

Important technical advantages of the present invention include providing improved network graphics. In particular, vector objects containing mathematical descriptions of lines, curves, fills, and patterns are used as graphics to be downloaded over a network. The vector objects require less memory space and thus can be downloaded faster. Additionally, the vector objects may be scaled without image degradation.

Another technical advantage of the present invention includes providing interactive network graphics. In particular, active areas may be defined by the vector objects. Thus, the active areas need not be separately defined. The active areas may conform to an image of the vector object. Accordingly, an image may be easily made to respond to user-initiated events and to perform specified actions. Additionally, the vector objects may be downloaded, cached and displayed at different sizes on the same or different Web pages or otherwise modified.

Still another technical advantage of the present invention includes providing device independent network graphics. In particular, vector graphics are scaled to the correct size when downloaded and display the maximum number of colors supported by the client system. Thus, the appearance of the graphics may be maximized on all client systems.

Other technical advantages will be readily apparent to one skilled in the art from the following figures, descriptions, and claims.

BRIEF DESCRIPTION OF THE DRAWINGS

For a more complete understanding of the present invention and its advantages thereof, reference is now made to the following brief description, taken in conjunction with the accompanying drawings and detailed description, wherein like reference numerals represent like parts, in which.

DETAILED DESCRIPTION OF THE INVENTION

The preferred embodiments of the present invention and its advantages are best understood by referring now in more detail to FIGS. 1–7 of the drawings, in which like numerals refer to like parts throughout the several views. FIGS. 1–7 illustrate a system and method of providing graphics over a network. As described in more detail below, the system and method employs interactive vector graphics that may be efficiently downloaded to a client system. On the client system, the vector graphics may be scaled, stored, manipulated and even modified. Accordingly, the interactive vector graphics system and method substantially improve network graphics.

Figure 1:
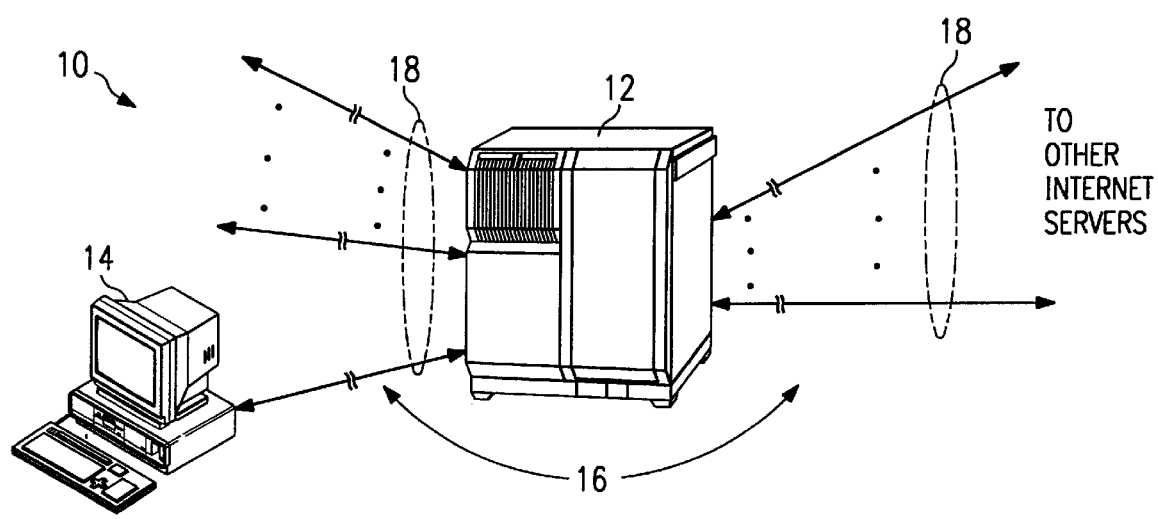
FIG. 1 is a schematic diagram illustrating a client system and a server system connected via the Internet in accordance with one embodiment of the present invention.

FIG. 1 illustrates a network interconnection 10 including a server system 12 connected to a client system 14 by a network 16. The server system 12 may be a computer such as a personal computer, file server, workstation, minicomputer, mainframe or any other computer capable of communicating and interconnecting with other computers. As described in more detail below, the server system 12 may include an input/output system, processor, and memory. The input/output system may connect the network 16 and other input and output devices to the server system 12. The network 16 may be directly connected to the server system 12 or may be connected through a data transmission device such as a modem or the like. The input devices may include a pointing device such as a mouse or trackpad, a keyboard, or the like. The output devices may include a monitor, a printer, or the like.

The client system 14 may be similar to the server system 12 and may be implemented using virtually any type of computer. As described in more detail below, the client system 12 is preferably a personal computer having an input/output system, a processor, and a memory. As previously described for the server system 12, the input/output system may connect the network 16 and other input and output devices to the client system 14.

The network 16 may include a plurality of communication lines 18 between the server system 12 and a plurality of clients such as the client system 14. The communication lines 18 may also connect the server system 12 to other server systems. In this manner, the server systems provide a connection to other server systems on the network 16 through the communication lines 18. Thus, a plurality of server systems may be disposed between the client system 14 and the server system 12 along communication lines 18.

Communication lines 18 may be any type of communication link capable of supporting data transfer. In one embodiment, the communication lines 18 may include any combination of an Integrated Services Digital Network (ISDN) communication line, a hardwire line, or a telephone link. It will be understood that the communication lines 18 may comprise other types of links within the scope of the present invention.

In one embodiment, the network 16 may be the Internet. In this embodiment, the server system 12 may be remote from the client system 14 and located anywhere in the world. Generally described, the client system 14 may communicate with the server system 12 using a Web browser application program that provides an address or URL of an Internet Web page stored on the server system 12. The client system 14 may access the server system 12 through a plurality of other server systems using HTTP and providing the URL to the other server systems. Eventually, the server system 12 is found and in response transmits the Internet Web page to the client system 14.

Although the network 16 is illustrated and described in FIG. 1 as the Internet, the network 16 may be any interconnection found on any computer network such as a local area network (LAN), a wide area network (WAN), an intranet, such as a corporate intranet, or any other communications and data exchange systems created by connecting two or more computers. For the convenience of the reader, the network 16 will be illustrated and described as the Internet. However, it should be understood that the present invention is not limited to network implementations using the Internet.

Figure 2:
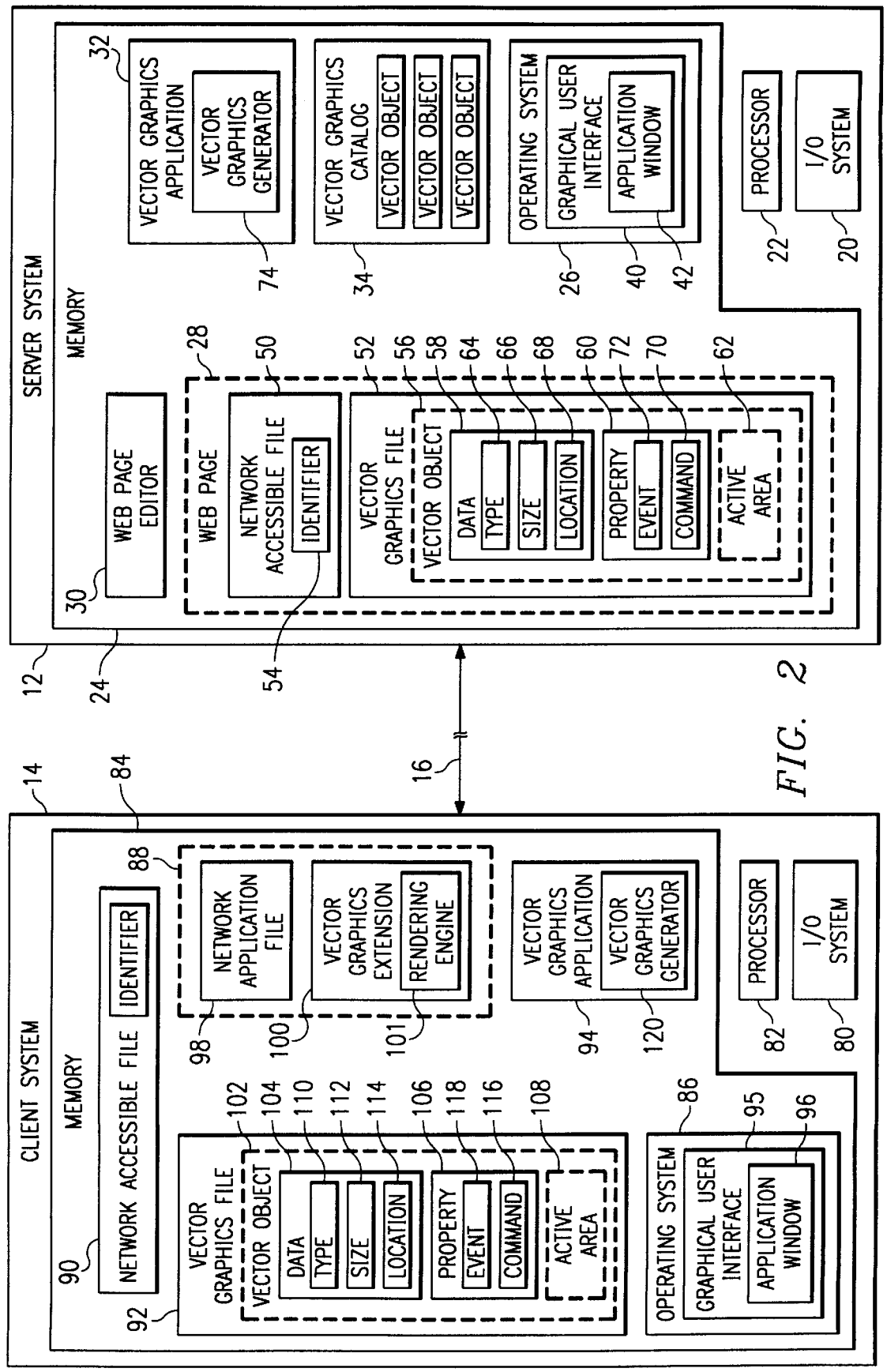
FIG. 2 is a schematic block diagram illustrating systems of the client and server systems of FIG. 1 in accordance with one embodiment of the present invention.

FIG. 2 illustrates a block diagram of the server system 12 and client system 14 in accordance with one embodiment of the present invention. The server system 12 may comprise an input/output system 20, a processor 22 and memory 24. As previously described, the input/output system 20 may connect the network 16 and other input and output devices to the server system 12. The network 16 may be directly connected to the server system 12 or may be connected through a data transmission device such as a modem or the like. Input devices may include a pointing device such as a mouse or trackpad, a keyboard, and the like. Output devices may include a monitor, a printer, and the like.

The server system 12 includes computer software that may be loaded into the memory 24 and executed by the processor 22. The computer software may generally be identified by modules and similar systems in memory 24. It will be understood that the computer software may be otherwise combined and/or divided for processing within the scope of the present invention. Accordingly, the labels of the modules and other software systems are for illustrative purposes and may be varied within the scope of the present invention.

The computer software may be loaded into memory 24 from disk storage (not shown). Disk storage may include a variety of types of storage media. For example, disk storage may include floppy disk drives, hard disk drives, CD/ROM drives, or magnetic tape drives.

Memory 24 may include an operating system 26, a Web page 28, a Web page editor 30, a vector graphics application 32, and a vector graphics catalog 34. The operating system 26 may include a graphical user interface (GUI) 40 capable of generating a plurality of application windows 42. The operating system 26 may be MacIntosh OS, WINDOWS NT, WINDOWS 95, OS/2, or any other operating system capable of providing a graphical user interface.

The Web page 28 may comprise a network accessible file 50 and a vector graphics file 52. The network accessible file 50 may include an identifier 54 linking the vector graphics file 52 to the network accessible file 50. Accordingly, the vector graphics 52 may be embedded in the network accessible file 50.

The network accessible file 50 is generally formatted to fit the environment in which it will be used. In one embodiment, the network accessible file 50 may be a Hypertext Markup Language (HTML) file conventionally used on the Internet. It will be understood that the network accessible file 50 may be otherwise formatted within the scope of the present invention.

In accordance with the present invention, the vector graphics file 52 may contain some or all graphics of the Web page 28. Accordingly, Web page graphics may be created and stored independently of the network accessible file 50. Moreover, as described in more detail below, the vector graphics file 52 provides interactive graphics that require less memory and therefore can be efficiently downloaded over the network 16 to the client system 14. On the client system 14, the vector graphics may be scaled without image degradation, otherwise modified, and used interactively.

As described in more detail below, the vector graphics file 52 is a drawing file that can be modified and downloaded. The vector graphics file 52 may comprise one or more vector objects 56. In one embodiment, the vector objects 56 may comprise data 58, one or more properties 60, and an active area 62. The data 58 may be operable in connection with a vector graphics network file to render an image of the vector object 56 on the client system 14. The data 58 may comprise a type 64, a size 66 and a location 68 of the vector object 56 in the Web page 28. It will be understood that the data 58 may include other characteristics such as color of the vector object 56.

The property 60 may define a command 70 to be performed in response to an event 72 within the active area 62 of the vector object 56. In one embodiment, the commands may include Jump, In Place Jump, Status Line, Cursor Shape, Object Color, Object Text, Move Over, Hide Object, and Show Object. The Jump command may instruct a browser to load and display a newly specified URL. The In Place Jump may instruct a plug-in to discard its contents and display a newly specified drawing. The Status Line command may display a text string in a browser status bar. The Cursor Shape command may set the shape of a cursor on a monitor. The Object Color command may set an interior-fill color of the vector object 56 to a specified color. The Object Text command may set text of the vector object 56 to a specified text. The Move Over command may move a center of the vector object 56 to a specified position. The Hide Object and Show Object commands may hide or show the vector object 56. It will be understood that the commands may carry out other functions within the scope of the present invention.

The events may be user-initiated events. In this embodiment, the events may be On Mouse Enter, On Mouse Leave, On Mouse Down, On Mouse Up, and On Load. The On Mouse Enter event may be initiated when a mouse pointer is moved over an image of a vector object 56. The On Mouse Leave event may be initiated when a mouse pointer is moved away from the image of the vector object 56. The On Mouse Down event may be initiated when a mouse button is depressed while over the image of the vector object 56. The On Mouse Up event may be initiated when the mouse button is released while over the image of the vector object 56. The On Load event may be initiated when the vector graphics file 52 containing the vector object 56 is open. It will be understood that other events may be used to initiate commands within the scope of the present invention.

The active area 62 may be defined by the vector object 56. In one embodiment, the active area 62 may conform to the image of the vector object 56. In this embodiment, the active area 62 may be defined by the type 64, size 66 and location 68 of the vector object 56. It will be understood that the active area 62 may be otherwise defined by the vector object 56. For example, the active area 62 may be defined by an upper, lower, central, exterior or other portion of the vector object 56.

The Web page editor 30 may generate the network accessible file 50 of the Web page 28. Accordingly, for the Internet embodiment of the network 16, the Web page editor 30 may be an HTML editor. It will be understood that the Web page editor 30 may generate other configurations of the network accessible file 50 in other network configurations within the scope of the present invention.

The vector graphics application 32 may generate the vector graphics file 52. The vector graphics application 32 may include a vector graphics generator 74 to generate and modify the vector object 56. In one embodiment, the vector graphics application 32 may be Micrografx DESIGNER, manufactured by Micrografx, Inc. of Richardson, Tex., the assignee of the present application. In this embodiment, the server system 12 should be configured to report MIME types of DRW, DS4, and DSF file formats used by Micrografx DESIGNER. It will be understood that other commercial drawing programs capable of generating vector graphics may be used as the vector graphics application 32 and that the server system 12 may be otherwise configured in connection with other vector graphics applications 32 within the scope of the present invention.

The vector graphics catalog 34 may comprise a series of vector objects 76 previously generated by the vector graphics application 32. As previously described for vector objects 56, the vector objects 76 may include data, properties and an active area. Accordingly, the vector graphics catalog 34 allows vector objects 76 to be created and stored along with their properties for later use in generating Web pages.

The client system 14 may comprise an input/output system 80, a processor 82 and memory 84. As previously described in connection with the input/output system 20, the input/output system 80 may connect the network 16 and other input and output devices to the client system 14. The network 16 may be directly connected to the client system 14 or may be connected through a data transmission device such as a modem or the like. Input devices may include a pointing device such as a mouse or trackpad, a keyboard, and the like. Output devices may include a monitor, a printer, and the like.

The client system 14 includes computer software that may be loaded and/or downloaded into memory 84 and executed by the processor 82. The computer software may generally be identified by modules and similar systems in memory 84. It will be understood that the computer software may be otherwise combined and/or divided for processing within the scope of the present invention. Accordingly, the labels of the modules and other software systems are for illustrative purposes and may be varied within the scope of the present invention.

As previously described in connection with memory 24, computer software may be loaded into memory 84 from disk storage (not shown). Disks storage may include a variety of types of storage media. For example, disk storage may include floppy disk drives, hard disk drives, CD/ROM drives, or magnetic tape drives.

Memory 84 may include an operating system 86, a vector graphics network file 88, a network accessible file 90, a vector graphics file 92 and a vector graphics application 94. The operating system 86 may include a graphical user interface (GUI) 95 capable of generating a plurality of application windows 96. The operating system 86 may be MacIntosh OS, WINDOWS NT, WINDOWS 95, OS/2, or any other operating system capable of providing a graphical user interface.

The vector graphics network file 88 may be operable to connect to the server system 12 over the network 16 and retrieve the vector graphics file 52. The retrieved vector graphics file 52 may be stored in memory 84 on the client system 14 as the vector graphics file 92. In one embodiment, the vector graphics network file 88 may comprise a network application file 98 and a vector graphics extension 100. The vector graphics extension 100 may be separated from the network application file 98 to allow vector graphics capabilities to be updated and/or replaced independently of the network application file 98. In this embodiment, the network application file 98 may retrieve the vector graphics file 52 by retrieving the network accessible file 50. The retrieved network accessible file 50 may be stored in memory 84 on the client system 14 as the network accessible file 90. The network accessible file 90 may then be read by the network application file 98 and the linked vector graphics file 52 identified and retrieved.

In one embodiment, the network application file 98 may be an Internet browser. The Internet browser may be Netscape NAVIGATOR, Microsoft INTERNET EXPLORER or other commercially available Internet browsers. It will be understood that the network application file 98 may be formatted to connect and retrieve files over other types of networks 16 within the scope of the present invention.

The vector graphics extension 100 should be compatible with the vector graphics application 32 that generates the vector graphics file 52 from which the vector graphics file 92 is copied. In this manner, the network application file 98 may call the vector graphics extension 100 to process the vector graphics file 92. When called, the vector graphics extension 100 may respond to the network application file 98 and issue commands back to the network application file 98. For example, the vector graphics extension 100 may issue event initiated commands of a vector object to the network application file 98.

In one embodiment, the vector graphics extension 100 may include a rendering engine 101. In this embodiment, the rendering engine 101 may be operable to read the vector graphics file 92, render images of vector objects, and print the images of the vector objects. The rendering engine 101 may generate vector graphics "on the fly." Accordingly, the graphics may be updated without resort to the server system 12. It will be understood that the rendering engine 101 may have other capabilities within the scope of the present invention.

In one embodiment, the vector graphics extension 100 may be Micrografx QUICKSILVER, manufactured by Micrografx, Inc. of Richardson, Tex., the assignee of the present application. Micrografx QUICKSILVER is fully compatible with Micrografx DESIGNER, which may be used as the vector graphics application 32. It will be understood that other types of vector graphics extensions 100 capable of processing vector graphics may be used within the scope of the present invention.

As previously discussed, the vector graphics file 92 may be a copy of the vector graphics file 52 downloaded over the network 16 by the network application file 98. Accordingly, as previously described in connection with the vector graphics file 52, the vector graphics file 92 may comprise one or more vector objects 102. In one embodiment, the vector objects 102 may comprise data 104, one or more properties 106, and an active area 108. The data 104 may be operable in connection with the vector graphics network file 98 to render an image of the vector object 102 on the client system 14. The image may be rendered on a monitor or the like. The data 104 may comprise a type 110, a size 112 and a location 114 of the vector object 102 in the displayed Web page. It will be understood that the data 104 may include other characteristics such as color of the vector object 104.

The property 106 may define a command 116 to be performed in response to an event 118 within the active area 108 of the vector object 102. Accordingly, the vector objects 102 detect and respond to events on the client system 14.

The commands 116 and events 118 may be as previously described in connection with the commands 70 and events 72. It will be understood that the commands 116 and events 118 may carry out other functions within the scope of the present invention.

The active area 108 may be defined by the vector object 102. In one embodiment, as previously described in connection with the active area 62, the active area 108 may conform to the image of the vector object 102. In this embodiment, the active area 108 may be defined by the type 110, size 112, and location 114 of the vector object 102. It will be understood that the active area 108 may be otherwise defined by the vector object 102. For example, the active area 108 may be defined by an upper, lower, central, exterior or other portion of the vector object 102.

The vector graphics application 94 may be used to modify the vector graphics file 92. To this end, the vector graphics application 94 should be compatible with the vector graphics file 92. The vector graphics application 94 may include a vector graphics generator 120 to modify the vector object 102. In one embodiment, the vector graphics application 94 may be Micrografx DESIGNER, manufactured by Micrografx, Inc. of Richardson, Tex., the assignee of the present application. It will be understood that other commercial drawing programs capable of modifying vector graphics may be used as the vector graphics application 94 within the scope of the present invention.

Figure 3:
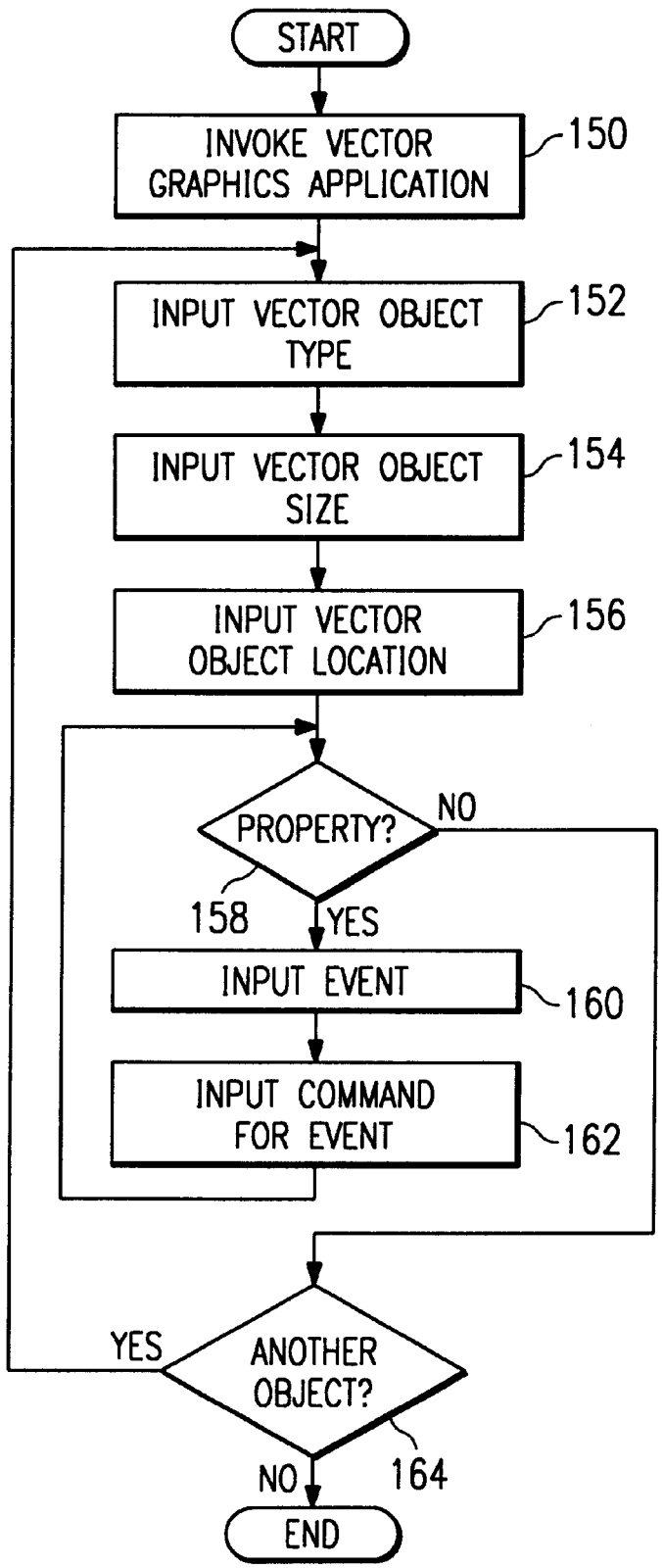
FIG. 3 is a flow diagram from a user's perspective illustrating a process of creating a vector graphics file in accordance with one embodiment of the present invention.

FIG. 3 illustrates a flow diagram by which a user may utilize the vector graphics application 32 of the server system 12 to generate the vector graphics file 52. The process begins at step 150 in which the user invokes the vector graphics application 32. In response, as described in more detail below, the vector graphics application 32 may open the vector graphics file 52 in the application window 42 of the graphical user interface (GUI) 40 of the operating system 26.

Figure 4:
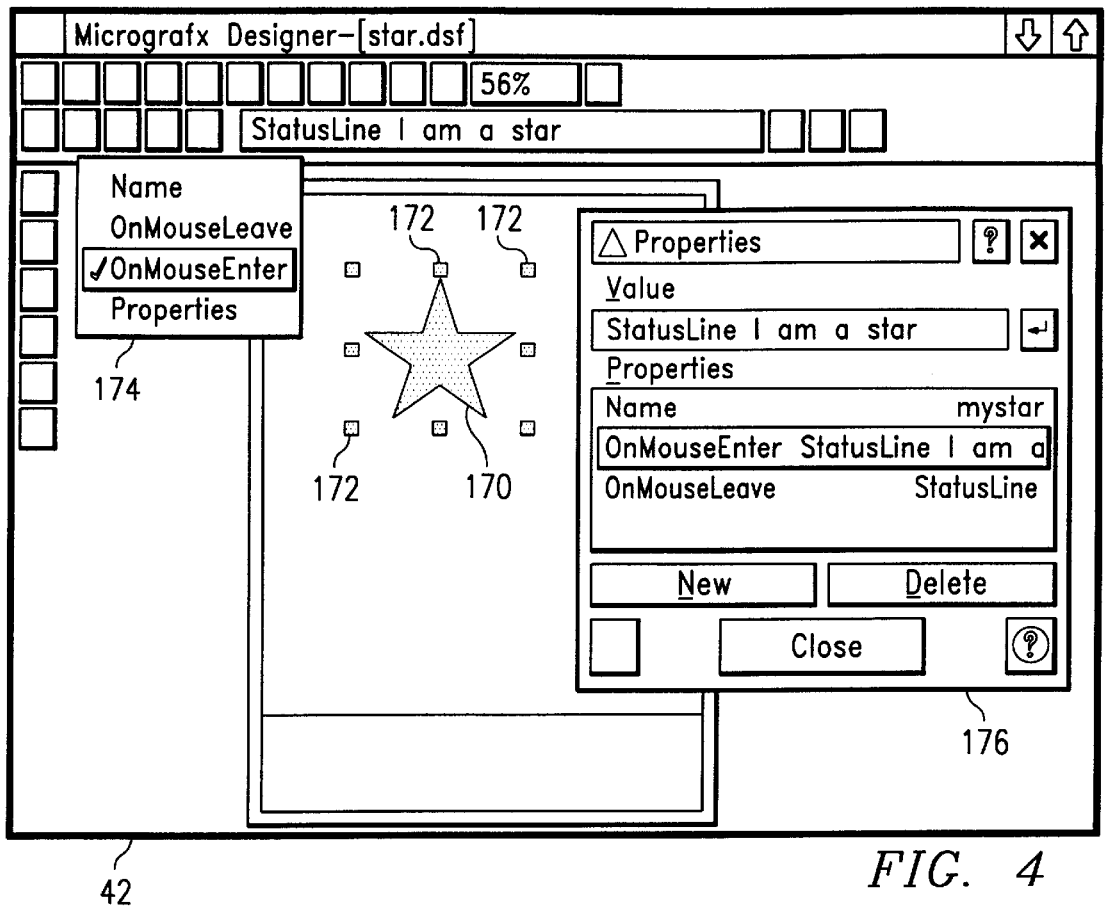
FIG. 4 illustrates a dialog box for defining properties of a vector object in accordance with one embodiment of the present invention.

Proceeding to step 152, the user may input a vector object type. Preferably, types of vector objects may be selected from a list displayed in a drop-down menu or the like. Types of vector objects may include squares, rectangles, circles, stars, triangles, ellipses and any other shape that may be described by a series of vectors. As shown by FIG. 4 and described in more detail below, the vector graphics application 32 may draw the selected vector object 170 in the application window 42 for viewing and manipulation by the user. For the embodiment of FIG. 4, the selected vector object 170 is a star.

At step 154, the user may input a vector object size. Preferably, the vector object size may be inputted by scaling the drawn vector object 170. As shown by FIG. 4, the drawn vector object 170 may be conventionally sized by using sizing points 172 located around the perimeter of the vector object 170. Accordingly, the user may view the vector object 170 while determining the desired size of the vector object 170.

Next, at step 156, the user may input a vector object location. Preferably, the vector object located is inputted by dragging the vector object 170 to its desired position in the vector graphics file 52. Accordingly, the user may view the vector object 170 while determining the desired location of the vector object 170. Step 156 leads to decisional step 158.

At decisional step 158, the user may select to add a property to the vector object 170. If the user selects to add a property to the vector object 170, the YES branch of decisional step 158 leads to step 160. At step 160, the user may input an event of the property. The event may be as previously described in connection with FIG. 2. Preferably, as shown by FIG. 4, the event may be selected from a list of events displayed in a drop-down menu 174. It will be understood that the events may be otherwise inputted within the scope of the present invention.

At step 162, the user may input a command for the event. The commands may be as previously described in connection with FIG. 2. Preferably, the commands may be selected from a list displayed in a pull-down menu or the like. As shown by FIG. 4, properties defined for the drawn vector object 170 may be displayed in a dialog box 176.

Step 162 returns to decisional step 158 where the user may select to add another property to the vector object 170. If another property is to be added, the YES branch of decisional step 158 again leads to step 160 and the cycle is repeated until no further properties are to be added to the vector object 170. When no properties or no further properties are to be added to the vector object 170, the NO branch of decisional step 158 leads to decisional step 164.

At decisional step 164, the user may select to add another object to the vector graphics file 52. If another vector object is selected to be added to the vector graphics file 52, the YES branch of decisional step 164 returns to step 152 where the user may input the type of the next vector object. Thereafter, as previously described, the user may size, locate and define properties of that vector object. When no further objects are to be added to the vector graphics file 52, the NO branch of decisional step 164 leads to the end of the process.

Figure 5:
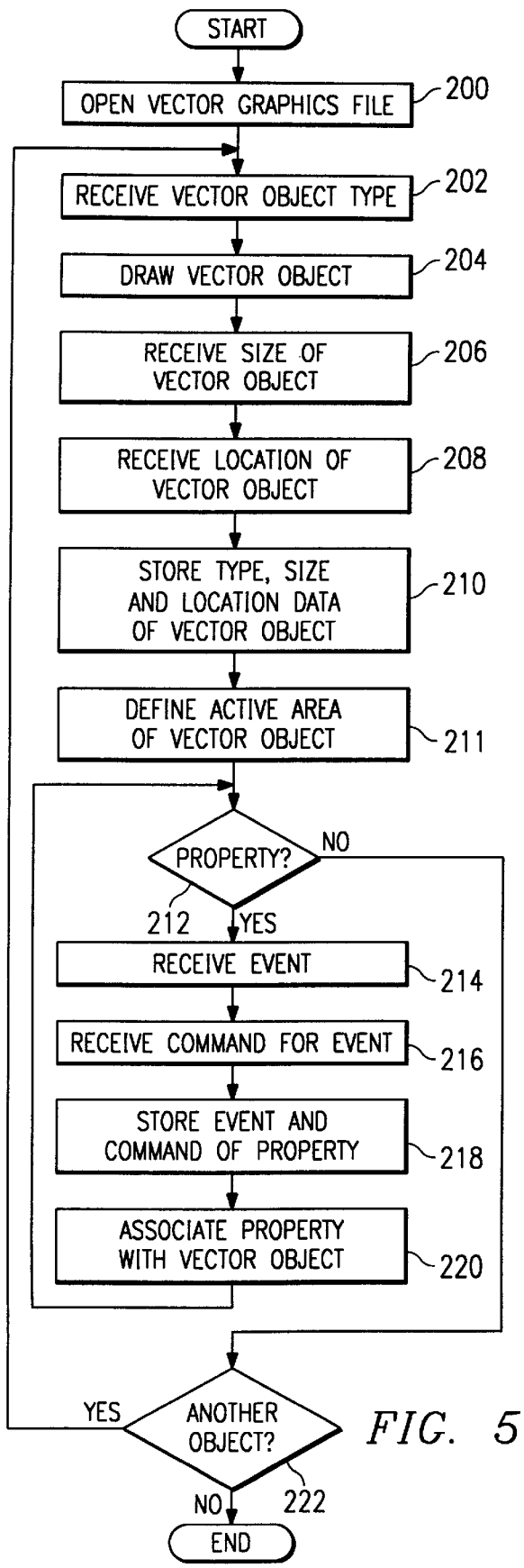
FIG. 5 is a flow diagram illustrating a method of generating a vector graphics file in accordance with one embodiment of the present invention.

FIG. 5 illustrates a flow diagram of generating the vector graphics file 52 in accordance with one embodiment of the present invention. The process begins at step 200 where the vector graphics application 32 may open the vector graphics file 52. As previously described, the vector graphics file 52 may be opened in response to the vector graphics application 32 being invoked by the user.

Next, at step 202, the vector graphics file 52 may receive a vector object type. The vector object type may be received by the selection of the user from a list displayed in a drop-down menu or the like. At step 204, as shown by FIG. 4, the vector graphics file 52 may draw the selected vector object 170. As previously described, this allows the user to view the vector object 170 while sizing and locating the vector object 170 in the vector graphics file 52.

Proceeding to step 206, the vector graphics file 52 may receive the size of the vector object 170. The size may be received by the scaling of the vector object 170 by the user. At step 208, vector graphics file 52 may receive the location of the vector object 170. The location of the vector object 170 may be received by receiving a drag and drop of the vector object 170 by the user.

Next, At step 210, the vector graphics file 52 may store the type, size, and location data of the vector object 170. In one embodiment, the data of each vector object 170 may be stored in a table of the vector graphics file 52. It will be understood that other data describing the vector object 170 may be received and stored for the vector object 170. For example, color of the vector object 170 may be received and stored along with the type, size, and location of the vector object 170.

Proceeding to step 211, an active area of the vector object 170 may be defined. As previously discussed, the active area may conform to the image of the vector object 170. In this embodiment, the active area may be defined by the type, size, and location of the vector object 170. It will be understood that the active area may be otherwise defined by the vector object 170. For example, the active area may be defined by an upper, lower, central, exterior or other portion of the vector object 170. Step 211 leads to decisional step 212.

At decisional step 212, it is determined if a property is to be added to the vector object 170. A property may be added to vector object 170 when a selection is received from the user. If a property is to be added to the vector object 170, the YES branch of decisional step 212 leads to step 214. At step 214, the vector graphics file 52 may receive an event of the property. The event may be received by a selection from the user. The event may be as previously described in connection with FIG. 2.

Next, at step 216, the vector graphics file 52 may receive a command for the event. The command may be received by a selection from the user. The command may be as previously described in connection with FIG. 2. Continuing to step 218, the vector graphics file 52 may store the event and the command of the property. At step 220, the property may be associated with the vector object 170.

Step 220 returns to decisional step 212 where it is determined if another property is to be added to the vector object 170. Another property may be added to the vector object 170 when the user selects to add another property. If another property is to be added, the YES branch of decisional step 212 again leads to step 214 and the cycle is repeated until no further properties are to be added to the vector object 170. When no properties or no further properties are to be added to the vector object 170, the NO branch of decisional step 212 leads to decisional step 222.

At decisional step 222, it is determined if another vector object is to be added to the vector graphics file 52. Another vector object may be added to the vector graphics file 52 when the user selects to add another vector object. If another vector object is to be added to the vector graphics file 52, the YES branch of decisional step 222 returns to step 202 where a vector object type of the next vector object may be received. Thereafter, as previously described, the vector graphics file 52 may draw the vector object, receive size and location data of the vector object, store the type, size, and location data of the vector object, and associated properties of the vector object. When no further vector objects are to be added to the vector graphics file 52, the NO branch of decisional step 222 leads to the end of the process.

Accordingly, the vector graphics file 52 comprises vector objects containing mathematical descriptions of lines, curves, fills, and patterns. At this point, the vector graphics file 52 may be embedded in the network accessible file 50 for use in Web page 28 of the server system 12. As described in more detail below, the vector objects require less memory space than conventional graphics and thus can be downloaded faster. Additionally, the vector objects may be scaled on a client system without image degradation.

Figure 6:
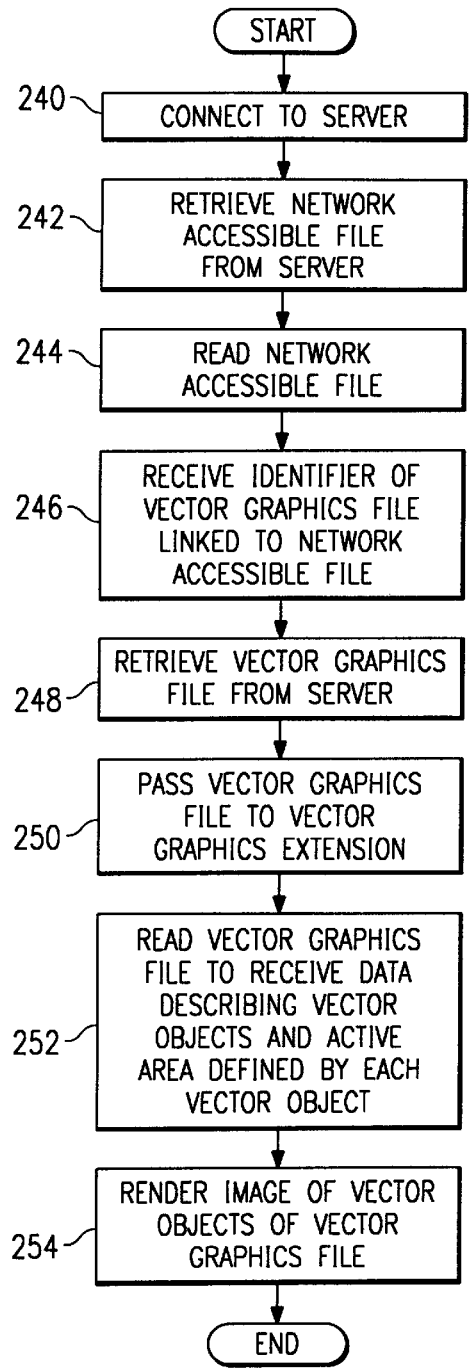
FIG. 6 is a flow diagram illustrating a method of downloading a vector graphics file and rendering vector objects in accordance with one embodiment of the present invention.

FIG. 6 illustrates a flow diagram of downloading the vector graphics file 52 from the server system 12 to the client system 14 over the network 16 in accordance with one embodiment of the present invention. The process begins at step 240 where the network application file 98 of the client system 14 may connect to server system 12 over the network 16. As previously described, the network application file 98 may be an Internet browser. The Internet browser may be operable to search, locate and download Web pages of server systems connected to the network 16.

Next, at step 242, the network application file 98 may retrieve the network accessible file 50. In the Internet embodiment, the network accessible file 50 may be an HTML file of the Web page 28. As previously described, the retrieved network accessible file 50 may be stored in memory 84 on the client system 14 as the network accessible file 90.

Proceeding to step 244, the network application file 98 may read the network accessible file 90. At step 246, the network application file 98 may receive the identifier linking the vector graphics file 52 to the network accessible file 90. In response, at step 248, the network application file 98 may retrieve the vector graphics file 52 from the server system 12. As previously described, the retrieved vector graphics file 52 may be stored in memory 84 of the client system 14 as the vector graphics file 92. At step 250, the network application file 98 may pass the vector graphics file 92 to the vector graphics extension 100 for processing.

Proceeding to step 252, the vector graphics extension 100 may read the vector graphics file 92 to receive data describing the vector object 102 and the active area 108 defined by the vector object 102. At step 254, the vector graphics extension 100 may render an image of the vector object 102. Step 254 leads to the end of the process.

Accordingly, the vector graphic file comprising vector objects may be downloaded from the server system to the client system over the network. Because the vector objects require less memory space than conventional graphics, the vector graphics files may be downloaded faster. Additionally, the vector objects may be cashed and displayed at different sizes on the same or different Web pages and otherwise modified. As previously described, the downloaded vector objects may be modified using the vector graphics application 94 of the client system 14. Moreover, the vector graphics are device independent. Accordingly, the vector graphics are scaled to the correct size when downloaded and display the maximum number of colors supported by the client system. Thus, the appearance of the graphics are maximized on all client systems.

Figure 7:
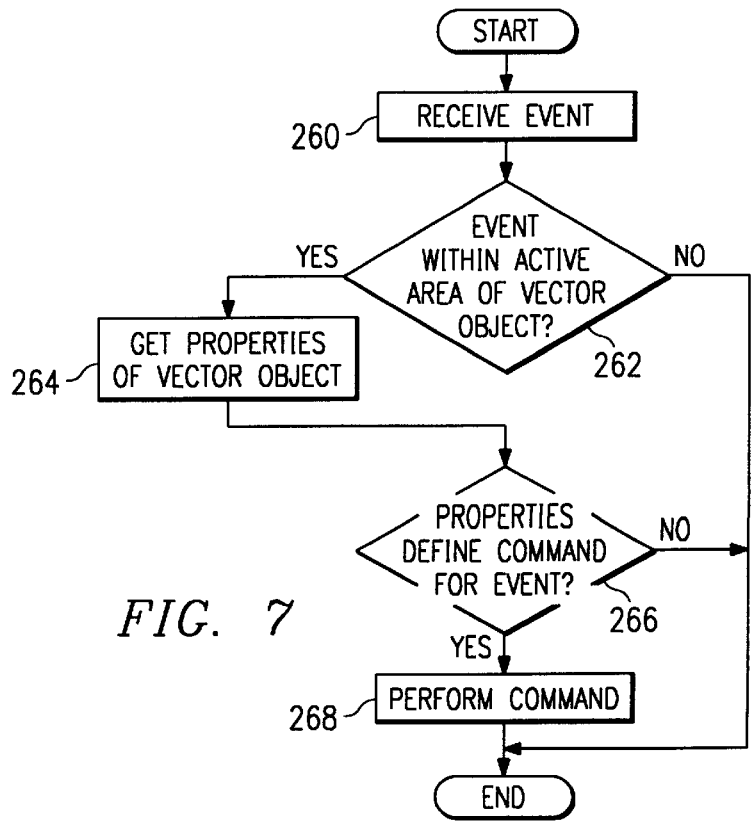
FIG. 7 is a flow diagram illustrating a method of processing events of the vector objects in accordance with one embodiment of the present invention.

FIG. 7 illustrates a flow diagram of processing events for vector objects of the client system 14. The process begins at step 260 where an event is received by the vector graphics extension 100. The event may be initiated by a user and received by the vector graphics extension 100 through the graphical user interface (GUI) 95 of the operating system 86. The event may be as previously described in connection with FIG. 2.

Next, at decisional step 262, the vector graphics extension 100 may determine if the event occurred within the active area 108 of the vector object 102. As previously described, the active area 108 may conform to the image of the vector object 102. In one embodiment, the vector graphics extension 100 may employ a rectangular box around the vector object 102 for trivial rejection in determining if an event occurred within the active area 108 of the vector object 102. In this embodiment, if the event occurred within the rectangular box, the vector graphics extension 100 may employ odd crossing techniques to determine if the event occurred within the active area of the vector object 102. It will be understood that other well known techniques may be used to determine if the event occurred within the active area of the vector object 102.

If the event did not occur within the active area 108 of the vector object 102, the NO branch of decisional step 262 leads to the end of the process. If the event occurred within the active area 108 of the vector object 102, the YES branch of decisional step 262 leads to step 264. At step 264, the vector graphics extension 100 may get the properties 106 of the vector object 102.

Proceeding to decisional step 266, it may be determined if the properties 106 define a command 116 for the event. If no command 116 is defined for the event, the NO branch of decisional step 266 leads to the end of the process. If the properties 106 define a command 116 for the event, the YES branch of decisional step 266 leads to step 268. At step 268, the vector graphics extension 100 may perform the command 116 defined for the event. Step 268 leads to the end of the process.

Accordingly, an interactive vector object may be generated on the server system and downloaded over the network to the client system. Moreover, the interactive vector objects include active areas defined by the vector objects. Thus, the active areas need not be separately defined. The active areas may conform to an image of the vector object. Accordingly, an image may be easily made to respond to user-initiated events and to perform specified actions.

Although the present invention has been described with several embodiments, various changes and modifications may be suggested to one skilled in the art. It is intended that the present invention encompass such changes and modifications as fall within the scope of the appended claims.

What is claimed is:

1. An interactive vector object stored on a computer readable medium and operable to be downloaded over a network comprising:

data operable to be downloaded to a client system connectable to the network and in connection with a vector graphics network file to render an image of the vector object on the client system;

an active area defined by the vector object; and a property defining a command to be performed in response to an event within the active area of the vector object.

2. The interactive vector object of claim 1, further comprising the active area conforming to the image of the vector object.

3. The interactive vector object of claim 1, the data further comprising a type, a size, and a location of the vector object.

4. The interactive vector object of claim 3, further comprising the active area defined by the type, size, and location of the vector object.

5. The interactive vector object of claim 1, further comprising the command operable to alter the image of the vector object on the client system.

6. The interactive vector object of claim 1, further comprising the command operable to reshape the image of the vector object on the client system.

7. The interactive vector object of claim 1, further comprising the command operable to recolor the image of the vector object on the client system.

8. The interactive vector object of claim 1, the vector graphics network file further comprising a vector graphics extension operable to render the image of the vector object on the client system.

9. The interactive vector object of claim 1, further comprising the data in connection with the vector graphics network file operable to render the image of the vector object within a window of a graphical user interface of the client system.

10. A server system operable to provide interactive vector graphics stored on a computer readable medium over a network, comprising:

a vector graphics file operable to be downloaded to a client system connectable to the network;

the vector graphics file comprising an interactive vector object, the vector object comprising:

data operable in connection with a vector graphics network file to render an image of the vector object on the client system;

an active area defined by the vector object; and a property defining a command be performed in response to an event within the active area of the vector object.

11. The server system of claim 10, further comprising the active area conforming to image of the vector object.

12. The server system of claim 10, the data further comprising a type, a size, and a location of the vector object.

13. The server system of claim 12, further comprising the active area defined by the type, size, and location of the vector object.

14. The server system of claim 10, further comprising the command operable to alter the image of the vector object on the client system.

15. The server system of claim 10, further comprising the command operable to reshape the image of the vector object on the client system.

16. The server system of claim 10, further comprising the command operable to recolor the image of the vector object on the client system.

17. The server system of claim 10, the vector graphics network file further comprising a vector graphics extension operable to render the image of the vector object on the client system.

18. The server system of claim 10, further comprising the data in connection with the vector graphics network file operable to render the image of the vector object within a window of a graphical user interface of the client system.

19. The server system of claim 10, the vector graphics file further comprising a plurality of vector objects.

20. The server system of claim 10, further comprising:

a network accessible file operable to be downloaded over the network; and the network accessible file including an identifier linking the vector graphics file to the network accessible file.

21. The server system of claim 20, the network accessible file further comprising a HTML file.

22. The server system of claim 20, wherein the vector graphics file is embedded in the network accessible file.

23. A Web page stored on a computer readable medium, the Web page comprising:

an HTML file operable to be downloaded over a network;

a vector graphics file linked to the HTML file;

the vector graphics file operable to be downloaded to a client system connectable to the network;

the vector graphics file comprising an interactive vector object, the vector object comprising:

data operable in connection with a vector graphics network file to render an image of the vector object on the client system;

an active area defined by the vector object; and a property defining a command be performed in response to an event within the active area of the vector object.

24. The Web page of claim 23, further comprising the active area conforming to the image of the vector object.

25. The Web page of claim 23, the data further comprising a type, a size, and a location of the vector object.

26. The Web page of claim 25, further comprising the active area defined by the type, size, and location of the vector object.

27. The Web page of claim 23, further comprising the command operable to alter the image of the vector object on the client system.

28. The Web page of claim 23, further comprising the command operable to reshape the image of the vector object on the client system.

29. The Web page of claim 23, further comprising the command operable to recolor the image of the vector object on the client system.

30. The Web page of claim 23, the vector graphics network file further comprising a vector graphics extension operable to render the image of the vector object on the client system.

31. The Web page of claim 23, further comprising the data in connection with the vector graphics network file operable to render the image of the vector object within a window of a graphical user interface of the client system.

32. The Web page of claim 23, the vector graphics file further comprising a plurality of interactive vector objects.

33. A system operable to provide interactive vector graphics over a network, comprising:

a server system, comprising:

a network accessible file, a vector graphics file linked to the network accessible file;

the vector graphics file comprising an interactive vector object, the vector object comprising:

data describing the vector object;

an active area defined by the vector object;

a property defining a command to be performed in response to an event within the active area of the vector object;

a client system, comprising:

a network application file operable to connect to the server over the network to retrieve the network accessible file;

the network application file operable to read the network accessible file and retrieve the linked vector graphics file; and a vector graphics extension operable to read the data to render an image of the vector object.

34. The system of claim 33, further comprising the active area conforming to the image of the vector object.

35. The system of claim 33, the data further comprising a type, a size, and a location of the vector object.

36. The system of claim 35, further comprising the active area defined by the type, size, and location of the vector object.

37. The system of claim 33, the network accessible file further comprising an HTML file.

38. The system of claim 33, the network application file further comprising an Internet browser.

39. The system of claim 33, the server system further comprising a vector graphics application operable to generate the vector graphics file.

40. The system of claim 33, the client system further comprising a vector graphics application operable to modify the vector graphics file.

41. The system of claim 33, the client system further comprising:

a graphical user interface having a window; and the vector graphics extension operable to render the image of the vector object within the window of the graphical user interface.

42. The system of claim 33, further comprising the vector graphics extension operable to perform the command in response to the event within the active area of the vector object.

43. The system of claim 33, further comprising the command operable to alter the image of the vector object on the client system.

44. A client system operable to provide interactive graphics over a network, comprising:

a vector graphics file downloaded to the client system over the network;

the vector graphics file comprising an interactive vector object, the vector object comprising:

data describing the vector object;

an active area defined by the vector object;
a property defining a command be performed in response to an event within the active area of the vector object; and
a vector graphics network file stored on a computer readable medium operable to read the data to render an image of the vector object.

45. The system of claim 44, further comprising the active area conforming to the image of the vector object.

46. The system of claim 44, the data further comprising a type, a size, and a location of the vector object.

47. The system of claim 46, further comprising the active area defined by the type, size, and location of the vector object.

48. The system of claim 44, further comprising the vector graphics network file operable to perform the command in response to the event within the active area of the vector object.

49. The system of claim 44, further comprising the command operable to alter the image of the vector object on the client system.

50. The system of claim 44, further comprising the command operable to reshape the image of the vector object on the client system.

51. The system of claim 44, further comprising the command operable to recolor the image of the vector object on the client system.

52. The system of claim 44, the vector graphics network file further comprising a vector graphics extension operable to render the image of the vector object on the client system.

53. The system of claim 44, further comprising:
a graphical user interface having a window; and
the vector graphics network file operable to render the image of the vector object within the window of the graphical user interface.

54. The system of claim 44, further comprising a vector graphics application operable to modify the vector graphics file downloaded over the network.

55. A vector graphics extension operable to provide interactive graphics over a network, comprising:
a rendering engine operable in connection with data describing a vector object downloaded over the network and an associated network application file to render an image of the vector object; and
the rendering engine operable to perform a command in response to an event within an active area defined by the vector object.

56. The vector graphics extension of claim 55, further comprising the active area conforming to the image of the vector object.

57. The vector graphics extension of claim 55, the data further comprising a type, a size, and a location of the vector object.

58. The vector graphics extension of claim 57, further comprising the active area defined by the type, size, and location of the vector object.

59. The vector graphics extension of claim 55, further comprising the command operable to alter the image of the vector object.

60. The vector graphics extension of claim 55, further comprising the command operable to reshape the image of the vector object.

61. The vector graphics extension of claim 55, further comprising the command operable to recolor the image of the vector object.

62. The vector graphics extension of claim 55, further comprising the command operable to relocate the image of the vector object.

63. The vector graphics extension of claim 55, further comprising the command operable to jump to a specified address of the network.

64. A method of providing interactive vector graphics over a network, comprising the steps of:
downloading over a network to a client system a vector object, the vector object comprising:
data describing the vector object;
an active area defined by the vector object;
a property defining a command to be performed in response to an event within the active area of the vector object; and
rendering an image of the vector object on the client system.

65. The method of claim 64, wherein the active area conforms to the image of the vector object.

66. The method of claim 64, wherein the data comprises a type, a size, and a location of the vector object.

67. The method of claim 66, wherein the active area is defined by the type, size, and location of the vector object.

68. The method of claim 64, further comprising performing the command in response to the event within the active area of the vector object.

69. The method of claim 68, wherein the step of performing the command in response to the event comprises the step of altering the image of the vector object on the client system.

70. The method of claim 68, wherein the step of performing the command in response to the event comprises the step of reshaping the image of the vector object on the client system.

71. The method of claim 68, wherein the step of performing the command in response to the event comprises the step of recoloring the image of the vector object on the client system.

72. The method of claim 68, wherein the step of performing the command in response to the event comprises the step of jumping to a specified address of the network.

73. The method of claim 64, further comprising the step of modifying the vector object downloaded over the network on the client system.

74. The method of claim 64, wherein the step of rendering an image of the vector object comprises the step of rendering the image of the vector object within a window of a graphical user interface of the client system.

75. The method of claim 64, wherein the network comprises an Internet connection.

76. The method of claim 64, further comprising the steps of:
storing the vector object in a vector graphics file on a server system; and
linking the vector graphics file to a network accessible file on the server system.

77. The method of claim 76, the step of downloading the vector object further comprising the steps of:
connecting to a server system over the network;
retrieving the network accessible file of the server system;
reading the network accessible file;
receiving from the network accessible file an identifier linking the vector graphics file to the network accessible file; and
retrieving the linked vector graphics file.

78. The method of claim 77, wherein the network accessible file is an HTML file.

79. The method of claim 77, the step of rendering the image of the vector object further comprising the steps of:
passing the vector graphics file to a vector graphics extension on the client system; and
reading the vector graphics file to receive data describing the vector object and an active area defined by the vector object.

* * * * *

UNITED STATES PATENT AND TRADEMARK OFFICE
CERTIFICATE OF CORRECTION

PATENT NO. : 6,057,854
APPLICATION NO. : 08/901043
DATED : May 2, 2000
INVENTOR(S) : John R. Davis, Jr. and Scott M. Glazer Page 1 of 2

It is certified that error appears in the above-identified patent and that said Letters Patent is hereby corrected as shown below:

In the Claims

Claim 1, Column 12
Lines 28-31, change "an active area defined by the vector object; and
a property defining a command to be performed in response to an event within the active area of the vector object." to -- an active area predefined by the vector object, the active area associated with a command to be performed in response to an event therein; and
a property defining the command to be performed in response to the event within the active area of the vector object. --

Claim 10, Column 13
Lines 1-4, change "an active area defined by the vector object; and
a property defining a command be performed in response to an event within the active area of the vector object." to -- an active area predefined by the vector object, the active area associated with a command to be performed in response to an event therein; and
a property defining the command be performed in response to the event within the active area of the vector object. --

Claim 23, Column 13
Lines 49-52, change "an active area defined by the vector object; and
a property defining a command be performed in response to an event within the active area of the vector object." to -- an active area predefined by the vector object, the active area associated with a command to be performed in response to an event therein; and
a property defining the command to be performed in response to the event within the active area of the vector object. --

Signed and Sealed this
Twentieth Day of August, 2013

Teresa Stanek Rea
*Acting Director of the United States Patent and Trademark Office*

CERTIFICATE OF CORRECTION (continued)
U.S. Pat. No. 6,057,854

In the Claims

Claim 33, Column 14
Lines 19-22, change "an active area defined by the vector object;
a property defining a command to be performed in response to an event within the active area of the vector object" to -- an active area predefined by the vector object, the active area associated with a command to be performed in response to an event therein;
a property defining the command to be performed in response to the event within the active area of the vector object --

Claim 44, Column 15
Lines 1-4, change "an active area defined by the vector object;
a property defining a command be performed in response to an event within the active area of the vector object; and" to -- an active area predefined by the vector object, the active area associated with a command to be performed in response to an event therein;
a property defining the command to be performed in response to the event within the active area of the vector object; and --

Claim 55, Column 15
Lines 43-44, change "an active area defined by the vector object." with -- an active area predefined by the vector object. --

Claim 64, Column 16
Lines 6-9, change "an active area defined by the vector object;
a property defining a command be performed in response to an event within the active area of the vector object; and" to -- an active area predefined by the vector object, the active area associated with a command to be performed in response to an event therein;
a property defining the command to be performed in response to the event within the active area of the vector object; and --